United States Patent [19]

Jones et al.

[11] Patent Number: 4,531,900
[45] Date of Patent: Jul. 30, 1985

[54] ROTARY ENGINE COOLING SYSTEM

[75] Inventors: Charles Jones, Hillsdale; Richard M. Gigon, Oradell; Edward J. Blum, Wayne, all of N.J.

[73] Assignee: John Deere Technologies International, Inc., Moline, Ill.

[21] Appl. No.: 618,099

[22] Filed: Jun. 7, 1984

[51] Int. Cl.³ .......................... F01C 1/22; F01C 21/06
[52] U.S. Cl. .................................... 418/61 A; 418/83
[58] Field of Search ................................ 418/61 A, 83

[56] References Cited

U.S. PATENT DOCUMENTS

| | | | |
|---|---|---|---|
| 3,007,460 | 11/1961 | Bentele et al. | 418/83 |
| 3,261,335 | 7/1966 | Zimmermann | 418/61 A |
| 3,289,647 | 12/1966 | Turner et al. | 418/83 |
| 3,295,505 | 1/1967 | Jordan | 418/83 |
| 3,572,984 | 3/1971 | Jones | 418/83 |
| 3,895,889 | 7/1975 | Loyd, Jr. et al. | 418/83 |
| 3,907,468 | 9/1975 | Green et al. | 418/83 |

FOREIGN PATENT DOCUMENTS 712523 1/1980 U.S.S.R. .............................. 418/83

OTHER PUBLICATIONS

Norbye, Jan P., *The Wankel Engine,* 1971, Chapter 6, "Housing and Rotor Cooling".
Yamamoto, Kenichi, *Rotary Engine,* 1971, pp. 63–67.

*Primary Examiner*—John J. Vrablik

[57] ABSTRACT

A rotary engine has a substantially trochoidal-shaped housing cavity in which a rotor planetates. A cooling system for the engine directs coolant along a single series path consisting of series connected groups of passages. Coolant enters near the intake port, passes downwardly and axially through the cooler regions of the engine, then passes upwardly and axially through the hotter regions. By first flowing through the coolest regions, coolant pressure is reduced, thus reducing the saturation temperature of the coolant and thereby enhancing the nucleate boiling heat transfer mechanism which predominates in the high heat flux region of the engine during high power level operation.

1 Claim, 9 Drawing Figures

ROTARY ENGINE COOLING SYSTEM

BACKGROUND OF THE INVENTION

The invention described herein was made in the performance of law under NASA Contract No. NAS 3-23056 and is subject to the provisions of Section 305 of the National Aeronautics and Space Act of 1958 (72 Stat. 435; 42 U.S.C. 2457).

This invention relates to a rotary internal combustion engine and, in particular, to a cooling system for such an engine of the Wankel type.

In liquid cooling systems for the housing assembly of rotary internal combustion engines of the Wankel type, such as disclosed in the U.S. Pat. No. 2,988,065 to Wankel et al., it is common practice to provide cooling flow passages in the housing, which passages extend substantially parallel to the axis of the engine mainshaft. Also commonly provided are header chambers in the housing end walls constructed and arranged to provide end-to-end interconnection of the passages and thereby provide flow of coolant through those passages. These conventional cooling systems are exemplified in the U.S. Pat. Nos. to Loyd, Jr. et al., 3,895,889; Turner et al., 3,289,647; Jones, 3,572,984 and Bentele et al., 3,007,460. In these conventional cooling systems, the primary heat transfer mechanism is convection. In the systems of Turner et al., Bentele et al. and Jones, the coolant flows through a series flow path, first flowing through the hotter regions of the housing, then flowing through the cooler regions downstream of the hotter regions. In Loyd, Jr. et al., for each rotor, the flow is split between two separate flow paths. One flow path directs coolant from the coolant inlet through the cooler portion of the housing. The other flow path directs coolant from the inlet through the hotter portion of the housing. In both of these types of known systems, heat transfer by convection is promoted by having the coolant pass through the hotter housing regions without having a decreased pressure due to first having passed through the cooler engine regions. However, in higher output engines, the heat fluxes can be considerably beyond the levels that can be adequately cooled by convective cooling. In such engines, the predominant cooling mechanism changes to one of nucleate boiling in the high heat flux regions of the engine. Accordingly, it would be desirable to provide a cooling system which enhances this nucleate boiling cooling mechanism.

SUMMARY OF THE INVENTION

An object of the present invention is to provide a cooling system for a high output rotary engine wherein the nucleate boiling cooling mechanism is enhanced.

Another object of the present invention is to provide such a cooling system in which coolant flow is upwards through the hotter engine portions to provide efficient removal of bubbles and vapor.

Another object of the present invention is to provide a rotary engine cooling system in which the coolant inlet and the coolant outlet are located at the top of the engine and in which coolant flows through the cooler engine portions before it flows through the hottest engine portions.

These and other objects are achieved by the present invention which includes a rotary engine housing consisting of a rotor housing section situated between two end housing sections. A plurality of coolant flow passages extend axially through the housing sections around the periphery of the trochoidal-shaped cavity. Coolant enters in the coolest area of the housing in the vicinity of the inlet port. Divider ribs in the end housings direct the coolant flow so that it flows in series through the cooler engine regions, then through the hottest or top-dead-center (TDC) region of the engine. The highest flow velocity is maintained in the TDC region. By flowing first through the cool regions, the coolant pressure drops and lowers the coolant saturation temperature and enhances the nucleate boiling heat transfer mechanism which operates in the TDC region downstream of the cooler regions.

DETAILED DESCRIPTION

The rotary engine housing includes an anti-drive end (ADE) housing 12, a trochoid rotor housing section 14 and a drive end (DE) housing section 16. These sections are aligned by dowels (not shown) which extend through aligned bores 18, 20 and 22, and are secured together by tie-bolts (not shown) which extend through aligned openings (not shown) in each of the housing sections.

Figure 1:
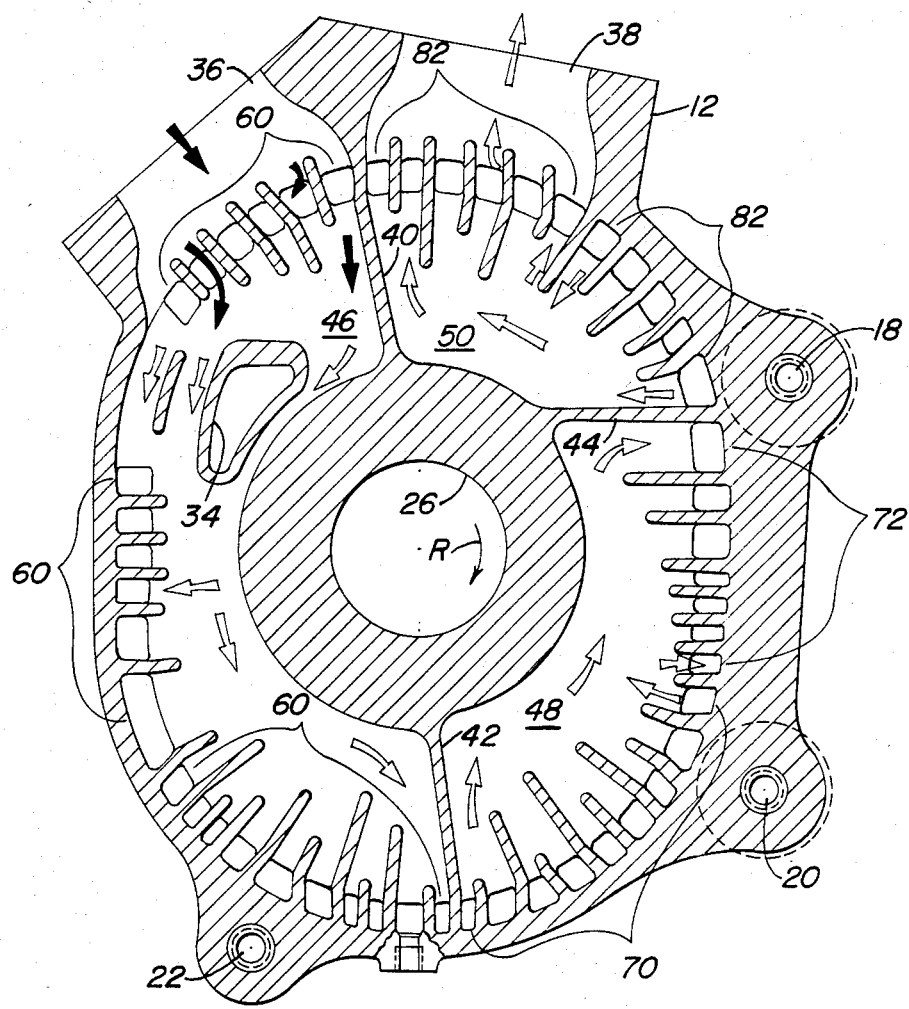
FIGS. 1, 2 and 3 are end views of the housing sections of a single rotor internal combustion engine having a cooling system according to the present invention.
Figure 2:
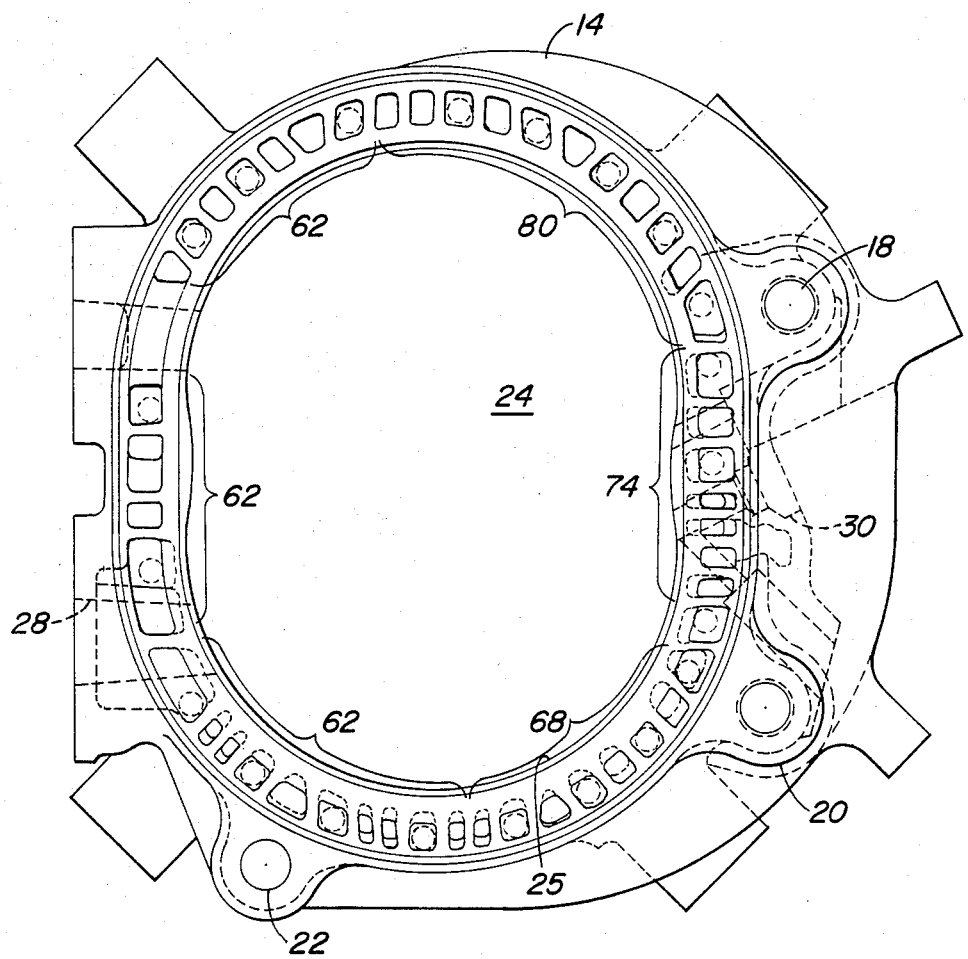
Figure 3:
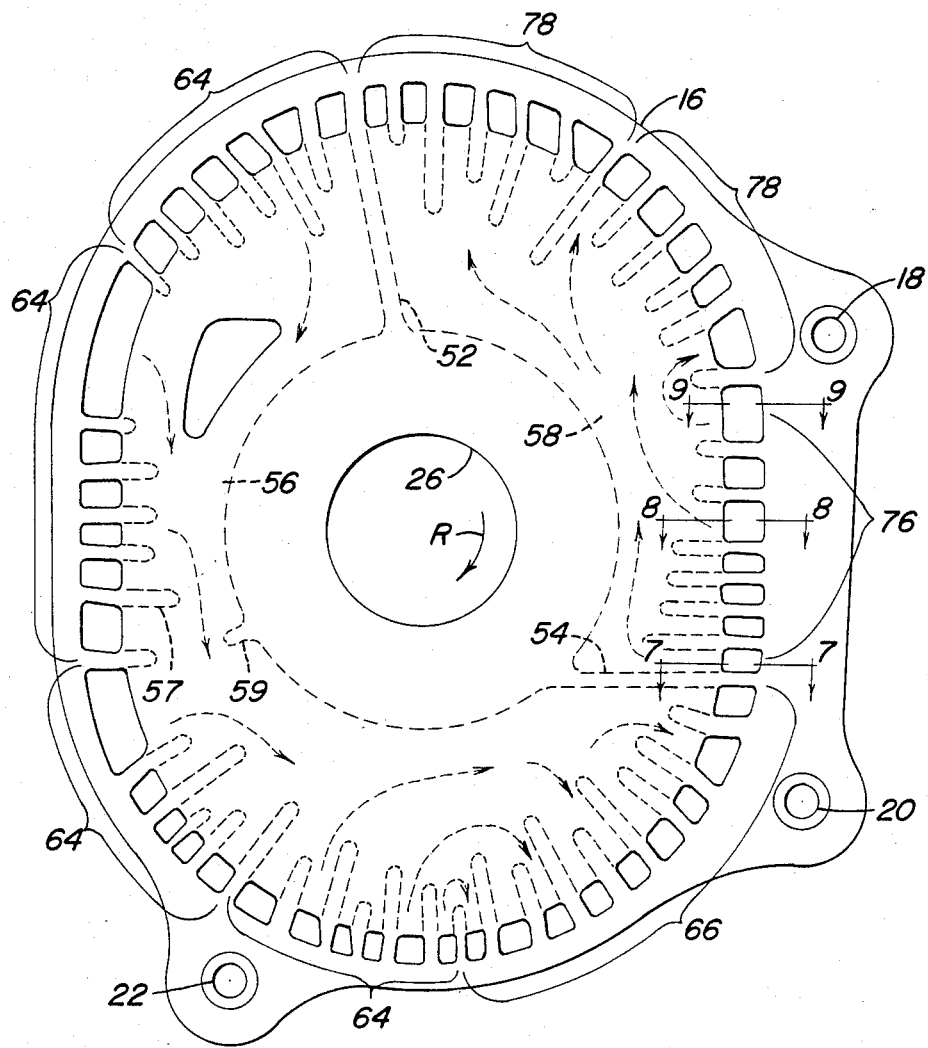

In the assembled condition, the housing has a substantially trochoidal-shaped cavity 24 surrounded by an inner wall 25 within which a rotor (not shown) is supported for planetation on a mainshaft (not shown), the mainshaft extending through the opening 26 in end wall sections 16 and 14. The housing section 12 is provided with an exhaust port 28 and an spark plug bore 30. The housing 14 has an air intake port 34. The intake port 34 functions to pass air into the combustion chambers (not shown) which are defined by the rotor (not shown) and disposed in the cavity 24. It is within the purview of this invention that any suitable means may be employed to provide a combustible mixture in the combustion chambers. As best seen in FIGS. 1 and 3, the direction of coolant flow, indicated by the arrows, is generally opposite to the direction of rotation of the rotor (not shown) indicated by arrow R.

These housing sections, in their normal operative position, are oriented such that the major axis of the trochoidal cavity 24 is vertical. Also, the relative positions of exhaust port 28, intake port 34 and spark plug bore 30 are such that combustion produces a heat flux distribution wherein the area of highest heat flux extends along the side of the housing 10 in which the spark plug (not shown) is located. This area between bores 18 and 20 is known as the top-dead-center (TDC) region. This heat flux phenomenon is well known and is further described in U.S. Pat. No. 3,895,889.

The present cooling system includes a coolant inlet 36 and a coolant outlet 38 located in the upper part of the ADE housing section 12. The coolant inlet 36 is near the intake port 34. The coolant outlet 38 is adjacent inlet 36 and is positioned in the compression region between the intake 34 and the TDC region of the housing. The end portion of ADE housing section 12 is not shown so that webs 40, 42 and 44, which define chambers 46, 48 and 50 therebetween, can be more clearly seen. DE housing section 16 has webs 52 and 54 which define chambers 56 and 58 therebetween. These chambers are, of course, also enclosed by front and rear end portions (not shown) of housing sections 14 and 16, the front end portion of ADE section 12 being removed for clarity, while the rear end portion of DE section 16 is not visible. Coolant flows from inlet 36 into chamber 46 and then from chamber 46 through the cool portion of the housing sections via axially extending passage groups 60, 62 and 64 in housing sections 12, 14 and 16, respectively, into chamber 56 of DE housing section 16. The coolant flows through chamber 56 and then back through a hotter portion of the housing 10 via axial passage groups 66, 68 and 70 into chamber 48 of ADE housing section 12. The coolant flows through chamber 48 and then through the relatively hot TDC portion of the housing via axially extending passage groups 72, 74 and 76 and into chamber 58 of DE housing section 16. Finally, the coolant flows through chamber 58 and back through the remaining relatively hot portion of the housing 10 via axial passage groups 78, 80 and 82, into chamber 50 of ADE housing section 12, and out of coolant outlet 38. Thus, these series-connected circumferentially-spaced of axially extending housing passages form a single series flow path with multiple axial flow portions. Note that before any coolant can reach the hottest TDC portion of the housing, it must first flow through the coolest housing portions via chamber 46, passages 60, 62 and 64 and chamber 56. Note also that the direction of coolant flow through the cooler housing portions is generally downward in chambers 46 and 58. Finally, note that the direction of coolant flow through the hotter housing portions is generally upward in chambers 48, 50 and 58. This upward flow in the hot region facilitates bubble and vapor removal.

As best seen in FIG. 3, the DE housing 16 includes ribs 57 and 59 which project generally towards each other in chamber 56, thereby restricting the generally downward flow of coolant in chamber 56. This restriction between ribs 57 and 59 operates to assure that substantially equal volumes of coolant flow through the axially extending coolant passage groups 60, 62 and 64 on either side of the restriction between ribs 57 and 59, and thus, assures that there will be sufficient coolant flow through the housings in the vicinity of exhaust port 28.

Figure 4:
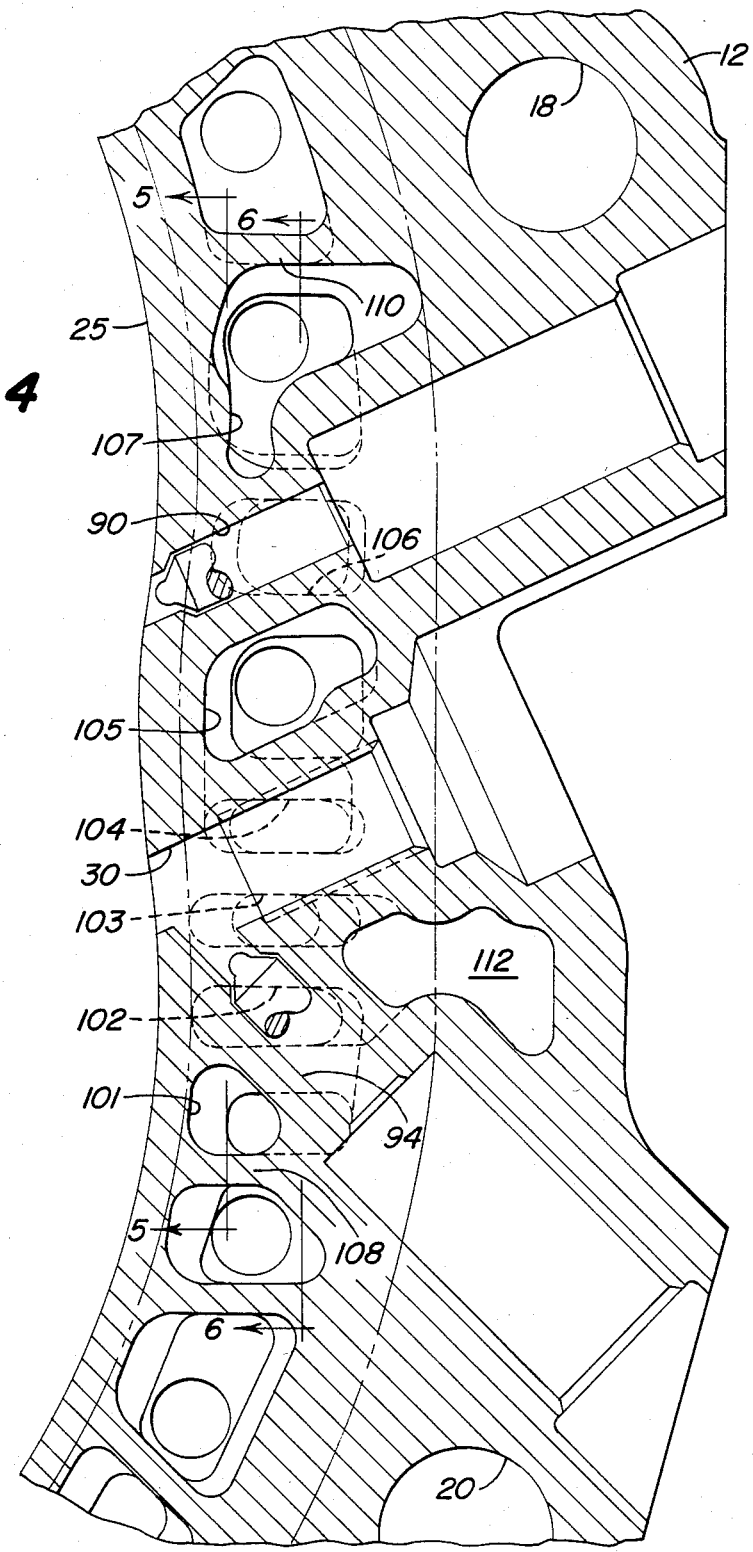
FIG. 4 is an enlarged sectional view of the top-dead-center (TDC) portion of the rotor housing taken in the plane of the spark plug and injector bores.
Figure 6:
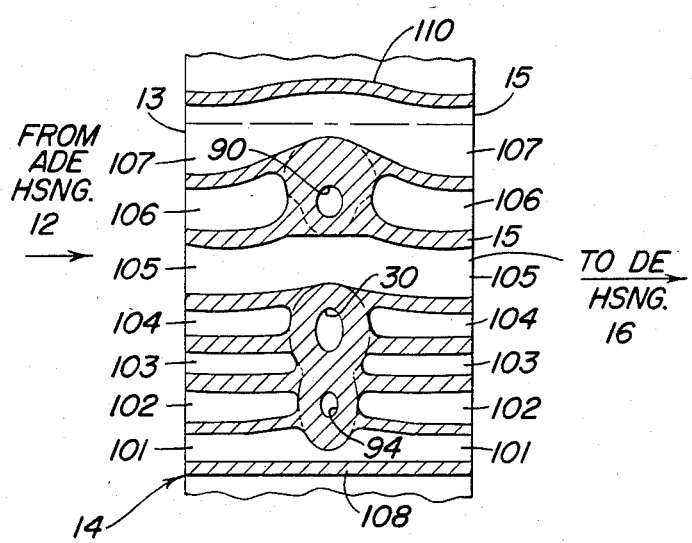
FIG. 6 is a sectional view along lines 6—6 of FIG. 4.
Figure 5:
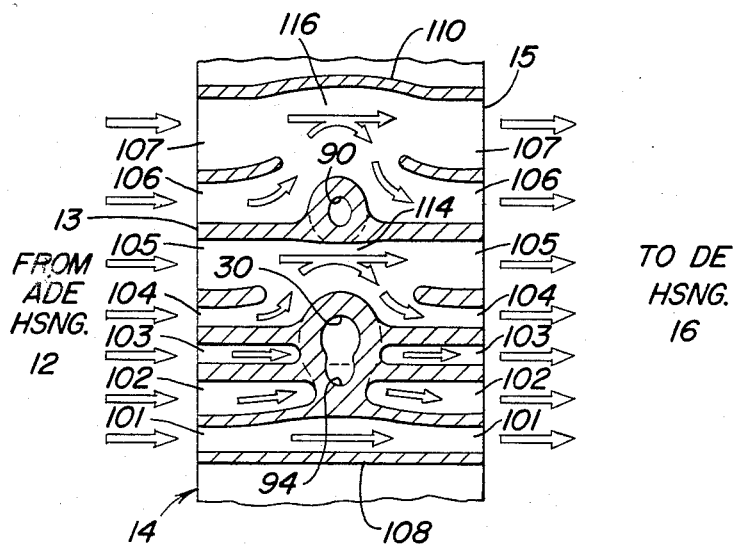
FIG. 5 is a sectional view along lines 5—5 of FIG. 4.
Figure 7:
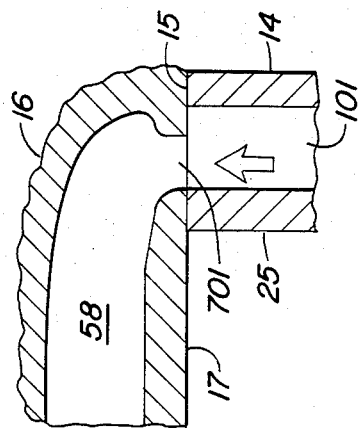
FIGS. 7, 8 and 9 are sectional views along lines 7—7, 8—8 and 9—9, respectively, of FIG. 3.
Figure 8:
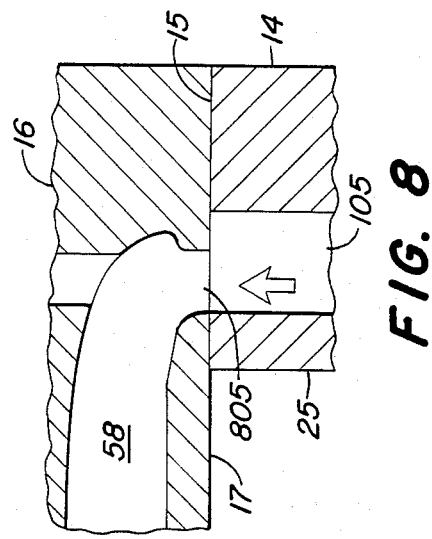
Figure 9:
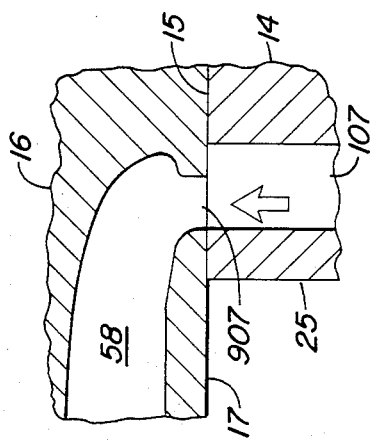

Turning to FIGS. 4, 5, and 6, the TDC portion of the rotor housing 14 includes a bore 90 for receiving a conventional main fuel injector (not shown), the bore 30 for a conventional spark plug (not shown), and a bore 94 for receiving a conventional pilot fuel injector (not shown). As best seen in FIGS. 5 and 6, between ribs 108 and 110, there are seven (7) coolant passages 101–107, entering the ADE side 13 of TDC portion and exiting on the DE side 15 of the TDC portion of rotor housing 14. As best seen in FIGS. 4–6, passages 102 and 103, to avoid bores 30 and 94, extend or bend away from inner rotor surface 25 as they move into the interior of rotor housing 14 where they merge into cavity 112 (FIG. 4). From cavity 112, they diverge and split up again into separate passages 102 and 103 as they exit from the DE 15 side of rotor housing 14.

Also, as best seen in FIGS. 4–6, passage 105 passes substantially straight through, but passage 104 bends to avoid bore 30 and merges with passage 105 in the interior of the TDC portion at 114 (FIG. 5). Passages 104 and 105 then again split apart as they exit the DE side 15 of rotor housing 14. Similarly, passages 106 and 107 enter the ADE side 13 separately. Then, both passages 106 and 107 bend to avoid bore 90 and merge together at 116 (FIG. 5), in the interior of the TDC portion of rotor housing 14, then again separate as they exit the DE side 15 of the rotor housing 14. This group of seven passages 101–107 register with corresponding passage groups 72 and 76 in the ADE and DE housings 12 and 16, respectively.

It should be noted that the highest heat fluxes are generated near the rotor housing 14 in its TDC portion near bores 30 and 94. However, it is this region through which extend the relatively tortuous passages 102, 103, 104 and 106, while passages 101, 105 and 107 pass nearly straight through rotor housing 14 in areas of relatively lower heat flux. If not otherwise compensated for, this situation could result in lower coolant flow rates just in the areas where lower flow rates are not desirable. Accordingly, the present cooling system includes restrictions in passages 101, 105 and 107. This feature of the present cooling system can best be understood with reference to FIGS. 3 and 7–9.

Turning to FIGS. 3, 7–9, the DE housing 16 has a side 17 for sealingly engaging the DE side 15 of rotor housing 14. Taking into account FIGS. 3, 5 and 7, it can be seen that passages 101, 105 and 107 register with passages 701 and 805 and 907, respectively, in DE housing 16. The cross sectional area of passages 701, 805 and 907 is smaller than that of their corresponding passages 101, 105 and 107. This, in effect, creates restrictions at the downstream ends of passages 101, 105 and 107. Preferably, the amount of restriction is adjusted so that the coolant flow rates are substantially equal in all seven TDC region passages 101–107. This same principle could also be used to bias the flow to match differences in heat flux between passages, if there is any variation between passages. A suggested degree of restriction is to make the cross-sectional area of each of passages 701, 805 and 907 be 56% of the cross-sectional area of passages 101, 105 and 107, respectively. This assures adequate coolant flow velocities in the high heat flux regions of the TDC portion of rotor housing 14. Alternatively, restrictions could be placed at the upstream side of passages 101, 105 and 107, to achieve the same effect. This slightly lowers the pressure in the more critical rotor housing passages and further enhances nucleate boiling.

For example, in an engine with a 40 cu. in. rotor and with a total coolant flow of 32 gallons per minute, this cooling system achieves a maximum coolant temperature rise of slightly above 10 degrees. The system also produces coolant flow velocities of 5 ft/sec in the area of inlet 34, in the compression area between inlet 34 and the TDC portion, and in the region just prior to exhaust port 28. The coolant flow velocity is 9 ft/sec in the region of initial gas expansion and 10 ft/sec in the TDC region between bores 18 and 20. At low power levels, the cooling mechanism is entirely convective, but at high power levels, the cooling mechanism becomes dominated by nucleate boiling in the high heat flux (TDC) region of the engine housings.

An important feature of the present invention, once nucleate boiling dominates over convective cooling in the high heat flux region, is that the critical metal temperatures in the high heat flux (TDC) region are a function of the heat flux and of the coolant saturation temperature. In this region, the metal temperatures can be reduced by keeping the saturation temperature (essentially the boiling point) of the coolant as low as possible. This is done by keeping the coolant pressure as low as possible. The present invention accomplishes this by passing the coolant through the pressure drop of the cool housing portions first, thus reducing pressure of the coolant and lowering its saturation temperature before it reaches the high heat flux TDC region.

In addition, in the present invention, the bubble and vapor wash direction is in the same direction as the coolant flow velocity. Although the flow velocity does not directly influence the cooled metal temperatures when the heat transfer means is primarily nucleate boiling, the efficient removal of vapor does help the engine to operate well below engine "burn-out" temperature.

While the invention has been described in conjunction with a specific size and embodiment, it is to be understood that many alternatives, modifications, and variations will be apparent to those skilled in the art in light of the aforegoing description. Accordingly, this invention is intended to embrace all such alternatives, modifications and variations which fall within the spirit and scope of the appended claims.

We claim:

1. In a rotary combustion engine with a rotor rotatable within a trochoidal cavity in a housing having an intake port region, an exhaust port region, an expansion region, a compression region, a top-dead-center region, and a liquid cooling circuit formed by series-connected circumferentially-spaced sets of axially extending housing passages forming a multi-pass series flow path, the improvement wherein the cooling circuit comprises:

a coolant inlet for receiving coolant in the vicinity of the intake port;

a coolant outlet positioned in the compression region between the inlet and the top-dead-center region; and passage means in the housing for directing coolant flow axially and generally in a direction opposite to the direction of rotor rotation from the coolant inlet to the coolant outlet, said passage means having a top-dead-center portion downstream of other portions in the intake port, exhaust port and expansion regions of the housing, coolant flowing in the top-dead-center portion having a pressure which is reduced by said coolant having first flowed through the said other portions, said reduced coolant pressure lowering a saturation temperature of the coolant and enhancing cooling by nucleate boiling in the top-dead-center portion.

* * * * *